(12) United States Patent
Lakemond (10) Patent No.: US 11,069,041 B2
(45) Date of Patent: Jul. 20, 2021

(54) BILATERAL FILTER WITH DATA MODEL

(71) Applicant: Imagination Technologies Limited, Kings Langley (GB)

(72) Inventor: Ruan Lakemond, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 70 days.

(21) Appl. No.: 16/451,231

(22) Filed: Jun. 25, 2019

(65) Prior Publication Data

US 2019/0392565 A1    Dec. 26, 2019

(30) Foreign Application Priority Data

Jun. 25, 2018   (GB) ..................................... 1810399

(51) Int. Cl.
*G06K 9/00* (2006.01)
*G06T 5/20* (2006.01)
*G06T 5/00* (2006.01)

(52) U.S. Cl.
CPC ................ *G06T 5/20* (2013.01); *G06T 5/002* (2013.01); *G06T 2207/10024* (2013.01); *G06T 2207/20028* (2013.01); *G06T 2207/20192* (2013.01)

(58) Field of Classification Search
CPC ...... G06K 9/6407; G06K 9/46; G06K 9/6423; G06K 9/3233; G06T 5/20; G06T 5/002;
(Continued)

(56) References Cited

U.S. PATENT DOCUMENTS 6,459,428 B1 * 10/2002 Burk .......................... G06T 5/20
345/419
6,490,526 B2 * 12/2002 Matteucci ................. G06T 7/64
702/5
(Continued)

FOREIGN PATENT DOCUMENTS

| EP | 1601184 A1 | 11/2005 |
|---|---|---|
| WO | 2016/183743 A1 | 11/2016 |

OTHER PUBLICATIONS

Vaudrey et al; "Fast Trilateral Filtering"; Computer Analysis of Images and Patterns; Sep. 2, 2009; pp. 541-548.
(Continued)

*Primary Examiner* — Amir Alavi
(74) *Attorney, Agent, or Firm* — Potomac Law Group, PLLC; Vincent M DeLuca (57) ABSTRACT

A method of filtering a target pixel in an image forms, for a kernel of pixels comprising the target pixel and its neighbouring pixels, a data model to model pixel values within the kernel; calculates a weight for each pixel of the kernel comprising: (i) a geometric term dependent on a difference in position between that pixel and the target pixel; and (ii) a data term dependent on a difference between a pixel value of that pixel and its predicted pixel value according to the data model; and uses the calculated weights to form a filtered pixel value for the target pixel, e.g. by updating the data model with a weighted regression analysis technique using the calculated weights for the pixels of the kernel; and evaluating the updated data model at the target pixel position so as to form the filtered pixel value for the target pixel.

20 Claims, 6 Drawing Sheets
(2 of 6 Drawing Sheet(s) Filed in Color)

(58) Field of Classification Search
CPC . G06T 2207/20192; G06T 2207/10024; G06T 2207/20028; G06T 2207/10016; G06F 17/30271; G06F 17/30545; F41H 11/02
See application file for complete search history.

(56) References Cited

U.S. PATENT DOCUMENTS

| | | | | |
|---|---|---|---|---|
| 6,577,312 | B2* | 6/2003 | Deering | G06T 5/20 |
| | | | | 345/428 |
| 6,744,435 | B2* | 6/2004 | Zwicker | G06T 15/04 |
| | | | | 345/424 |
| 6,956,582 | B2* | 10/2005 | Tidwell | G06T 5/20 |
| | | | | 345/428 |
| 7,359,576 | B1* | 4/2008 | Worthington | G06T 5/20 |
| | | | | 382/205 |
| 7,706,625 | B2* | 4/2010 | Friedrich | G06T 5/20 |
| | | | | 382/260 |
| 9,497,429 | B2* | 11/2016 | Mullis | H04N 5/332 |
| 10,019,848 | B2* | 7/2018 | Hemani | G06T 19/20 |
| 10,242,434 | B1* | 3/2019 | Holub | G06T 3/0006 |
| 10,778,194 | B2* | 9/2020 | Li | G06N 20/00 |
| 2006/0245002 | A1 | 11/2006 | Kita | |
| 2019/0392565 | A1* | 12/2019 | Lakemond | G06T 5/20 |

OTHER PUBLICATIONS

Buades et al; "The staircasing effect in neighborhood filters and its solution"; IEEE Transactions on Image Processing; vol. 15; No. 6; Jun. 1, 2006; pp. 1499-1505.

* cited by examiner

BILATERAL FILTER WITH DATA MODEL

BACKGROUND

The present disclosure relates to a method of filtering a target pixel in an image.

Image filters are often used to process images. For example, an image filter may be used to blur or sharpen an image. One example of an image filter is a bilateral filter.

A bilateral filter is a non-linear, edge-preserving, and noise-reducing smoothing filter for images. A standard bilateral filter can determine a filtered value ($I_{filtered}(x)$) for a target pixel based on a weighted average of intensity values from neighbouring pixels. For example, a weighted sum of neighbouring pixel values ($I(x_i)$) within a kernel ($\Omega$) can be used, wherein the weight for a particular neighbouring pixel in the sum is based on both: (i) the spatial distance between the target pixel and the neighbouring pixel ($\|x_i-x\|$), and (ii) the difference between the target pixel value and the neighbouring pixel value ($\|I(x_i)-I(x)\|$). The kernel ($\Omega$) would typically be a square kernel (e.g. 3×3 or 5×5) centred on the target pixel (x), but in general the kernel could be any suitable shape and size.

For example, a filtered pixel value, $I_{filtered}(x)$, at position x may be given as:

$$I_{filtered}(x) = \frac{1}{K} \sum_{x_i \in \Omega} I(x_i) d(I(x_i) - I(x)) g(x_i - x)$$

where d is a data term, often referred to as the "photometric cost function", which is a function of the difference between the target pixel value and the neighbouring pixel value ($I(x_i)-I(x)$) and g is a geometric term which is a function of the spatial distance between the target pixel and the neighbouring pixel ($x_i-x$); and K is a normalisation term, given by $K=\sum_{x_i \in \Omega} d(I(x_i)-I(x))g(x_i-x)$.

The data term (d) and the geometric term (g) can, for example, be Gaussian functions, for example:

$$d(q) = e^{-\frac{\|q\|^2}{2\sigma_d^2}} \text{ and } g(q) = e^{-\frac{\|q\|^2}{2\sigma_g^2}}$$

where $\sigma_d$ and $\sigma_g$ are smoothing parameters.

When the argument q is set to the pixel value difference $I(x_i)-I(x)$ the data term (d) becomes:

$$d = e^{-\frac{\|I(x_i)-I(x)\|^2}{2\sigma_d^2}}$$

And similarly, when the argument q is set to the spatial distance $x_i-x$ the geometric term (g) becomes:

$$g = e^{-\frac{\|x_i-x\|^2}{2\sigma_g^2}}$$

The functions d( ) and g( ) are both Gaussian functions, differing only in the smoothing parameters $\sigma_d$ and $\sigma_g$.

However, standard bilateral filters often produce a flattened output, yielding an "oil-painting" effect, whereby subtle gradients are flattened and false edges are introduced into filtered images.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to a first aspect of the present invention there is provided a method of filtering a target pixel in an image comprising: forming, for a kernel of pixels comprising the target pixel and its neighbouring pixels, a data model to model pixel values within the kernel; calculating a weight for each pixel of the kernel comprising: (i) a geometric term dependent on a difference in position between that pixel and the target pixel; and (ii) a data term dependent on a difference between a pixel value of that pixel and its predicted pixel value according to the data model; and using the calculated weights for the pixels in the kernel to form a filtered pixel value for the target pixel.

Using the calculated weights may comprise: updating the data model with a weighted regression analysis technique using the calculated weights for the pixels of the kernel; and evaluating the updated data model at the target pixel position so as to form the filtered pixel value for the target pixel.

The method may further comprise performing one or more iterations of the calculating and updating steps, wherein updated weights are calculated using the updated data model of the preceding iteration.

Updating the data model may comprise minimising a weighted sum of the squared residual errors between the pixel values of the kernel predicted by the data model and the corresponding actual pixel values of the kernel.

The weighted regression analysis technique may comprise performing a weighted least squares method.

The weighted regression analysis technique may comprise performing a weighted local gradient measurements method.

Forming a data model may comprise applying a first filter to the kernel so as to form a target pixel value for use in calculating the weights.

The first filter may be a bilateral filter.

The data model may be defined by one or more parameters including one or more gradient parameters, β, and an estimated value, Î, at the position of the target pixel, and wherein forming the data model comprises selecting a data model defining a curve or surface suitable for modelling the pixel values within the kernel, and setting the one or more gradient parameters of the data model to zero.

The data model may be a bilinear data model, a linear data model, a biquadratic data model, a quadratic data model, a parametric data model or a polynomial data model.

Each pixel value may comprise one or more characteristics of the respective pixel.

Each characteristic may be one or more of depth information, information describing normal vectors for surfaces identified in the image, texture information, luma, luminance, chrominance, brightness, lightness, hue, saturation, chroma, colourfulness, or any colour component.

The method may further comprise forming the filtered pixel value for the target pixel for a first channel in accordance with any preceding claim; and forming a second filtered pixel value for the target pixel for a second channel in dependence on a second data model, by: forming, for the kernel of pixels comprising the target pixel and its neighbouring pixels, a second data model to model a second characteristic represented by pixel values within the kernel; calculating a weight for each pixel of the kernel comprising: (i) a geometric term dependent on a difference in position between that pixel and the target pixel; and (ii) a data term dependent on a difference between a pixel value of that pixel and its predicted pixel value according to the second data model; and using the calculated weights for the pixels in the kernel so as to form a second filtered pixel value for the target pixel.

The kernel may be symmetric about the target pixel.

The kernel may be asymmetric about the target pixel.

The filtering may be cross filtering, such that the filtered pixel value is in a first channel, and the data term is dependent on pixel value differences in a second channel.

The data term may be dependent on pixel value differences in more than one channel.

Forming a data model may comprise: determining average gradients ($\beta$) in both x and y directions, from a summation of multiple pixel value differences determined from pairs of pixels located within the kernel; determining, from each pixel in the kernel, an estimated pixel value Ĩ at the target pixel position based on the determined average gradients; determining a model pixel value Î at the target pixel position by performing a weighted sum of the estimated pixel values Ĩ determined from each of the pixels in the kernel.

According to a second aspect of the present invention there is provided a data processing system for filtering a target pixel in an image, the data processing system comprising: a data model formation unit configured to form, for a kernel of pixels comprising the target pixel and its neighbouring pixels, a data model to model pixel values within the kernel; a weight calculating unit configured to calculate a weight for each pixel of the kernel comprising: (i) a geometric term dependent on a difference in position between that pixel and the target pixel; and (ii) a data term dependent on a difference between a pixel value of that pixel and its predicted pixel value according to the data model; a data modelling unit configured to use the calculated weights for the pixels in the kernel so as to form a filtered pixel value for the target pixel.

The data modelling unit may comprise: a data model updating unit configured to update the data model with a weighted regression analysis technique using the calculated weights for the pixels of the kernel; and a data model evaluating unit configured to evaluate the updated data model at the target pixel position so as to form a filtered pixel value for the target pixel.

The data processing system may be configured to perform one or more iterations of the calculating in the weight calculating unit and the updating in the data model updating unit, wherein the weight calculating unit is configured to use the updated data model of the preceding iteration to calculate updated weights.

The data model updating unit may be configured to update the data model by minimising a weighted sum of the squared residual errors between the pixel values of the kernel predicted by the data model and the corresponding actual pixel values of the kernel.

The data model may be defined by one or more parameters including one or more gradient parameters, $\beta$, and an estimated value, Î, at the position of the target pixel, and wherein the data model formation unit is configured to select a data model defining a curve or surface suitable for modelling the pixel values within the kernel, and set the one or more gradient parameters of the data model to zero.

There is also provided a data processing system configured to perform the method described herein. The data processing system may be embodied in hardware on an integrated circuit. There may be provided a method of manufacturing, at an integrated circuit manufacturing system, the data processing system. There may be provided an integrated circuit definition dataset that, when processed in an integrated circuit manufacturing system, configures the system to manufacture the data processing system. There may be provided a non-transitory computer readable storage medium having stored thereon a computer readable description of an integrated circuit that, when processed in an integrated circuit manufacturing system, causes the integrated circuit manufacturing system to manufacture the data processing system.

There may also be provided an integrated circuit manufacturing system comprising: a non-transitory computer readable storage medium having stored thereon a computer readable integrated circuit description that describes the data processing system; a layout processing system configured to process the integrated circuit description so as to generate a circuit layout description of an integrated circuit embodying the data processing system; and an integrated circuit generation system configured to manufacture the data processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is described by way of example with reference to the accompanying drawings. In the drawings.

DETAILED DESCRIPTION

The following description is presented by way of example to enable a person skilled in the art to make and use the invention. The present invention is not limited to the examples described herein and various modifications to the disclosed embodiments will be apparent to those skilled in the art. Embodiments are described by way of example only.

The examples described herein relate to bilateral filters, however, they may be applicable to other image filters.

Standard bilateral filters often "flatten" subtle gradients and introduce false edges into filtered images. One reason that this occurs is because the data term (d) tends to bias pixel values towards being the same as the neighbouring pixel values. That is, the data term (d) makes a larger contribution to the weighted combination when a neighbouring pixel has a similar value to the target pixel. In other words, the data term (d) assumes that pixels relevant to the target pixel have similar value. However, regions of uniform pixel value that satisfy this assumption are very rare in most real images. That is, there is usually at least some gradient across the pixel values present in real-images.

An alternative method for filtering a target pixel value is provided herein. A data model can be formed for modelling the variation in the pixel values of an image. The data model can be fitted to the pixel values of the image using a weighted linear regression technique. The weights applied to the pixel values of the image during fitting are based on the weights traditionally defined by the bilateral filter equation. That is, the weights may comprise a data term and a geometric term as presented above, but in contrast to traditional bilateral filters the data term is additionally dependent on the data model itself. The updated data model can be evaluated at the target pixel position so as to provide a filtered value for the target pixel. The weights, the data model and the filtered value for the target pixel are hence interdependent, and may be iteratively refined.

Figure 5A:
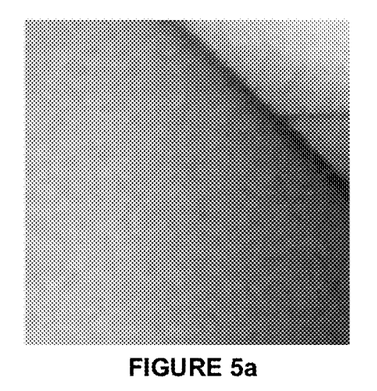
FIG. 5a depicts an input image.
Figure 5B:
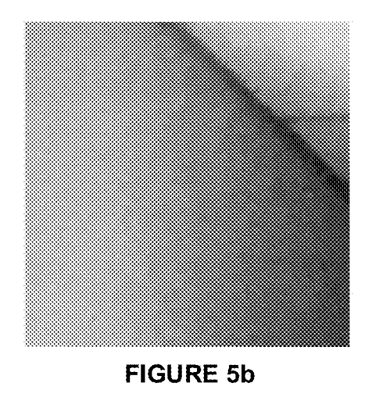
FIG. 5b depicts a result of filtering the input image of FIG. 5a using a standard bilateral filter.
Figure 5C:
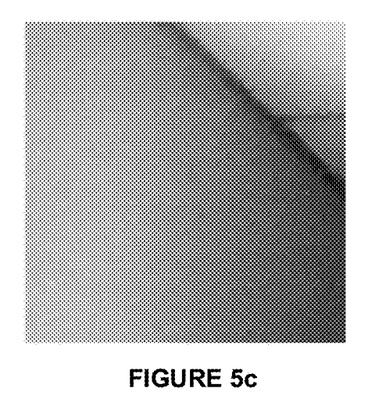
FIG. 5c depicts a result of filtering the input image of FIG. 5a using the system for filtering an image described herein.

Image filters in accordance with the present disclosure provide good modelling and good denoising for soft gradients in images, and few or no flattening artefacts are produced. An example is shown in FIGS. 5a to 5c. FIG. 5a depicts an input image; FIG. 5b depicts a result of filtering the input image of FIG. 5a using a standard bilateral filter; and FIG. 5c depicts a result of filtering the input image of FIG. 5a using the system for filtering an image described herein. It can be seen in FIG. 5b that the standard bilateral filter flattens subtle gradients, which produces the slightly mottled ("oil-painting") effect into the image; whereas the image in FIG. 5c is smoother over the section having slight gradients, whilst still preserving the edges.

Figure 1:
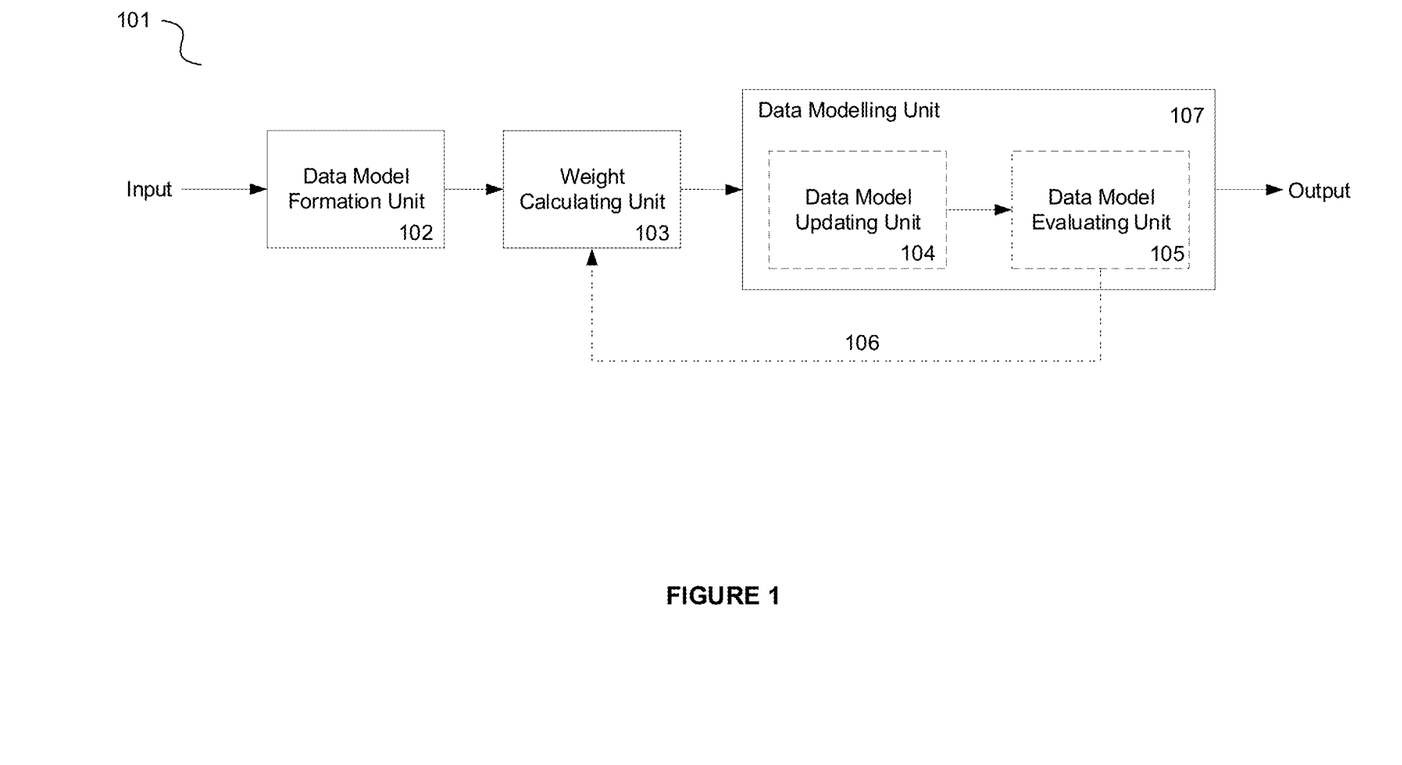
FIG. 1 depicts a system for filtering an image.

FIG. 1 depicts a system 101 for filtering an image. The system 101 may comprise a data model formation unit 102, a weight calculating unit 103, and a data modelling unit 107. The data modelling unit 107 may comprise a data model updating unit 104, and a model evaluating unit 105. The system may also comprise an iterative loop 106.

An image is input to the system. The image may be, for example, a still image or a frame of a video. The image may comprise a plurality of pixels. The input may represent all of the pixels of an image, or a sub-set of the pixels of an image. The output of the system may be one or more filtered pixels of the image. All of, or a sub-set of, the pixels of the input may be filtered and output from the system.

Data Model

In accordance with the following examples, a data model may be formed by data model formation unit 102 to model the pixel values within a kernel. The data model may be suitable for modelling the pixel values, within a kernel, of the image input into the system. For example, the data model may be a first-order, or a higher order, data model of the pixel values within the kernel.

The data model may be used to model the variation in pixel values within one or more kernels. Each kernel may include a target pixel to be filtered and a plurality of neighbouring pixels. The data model may model the local gradients surrounding the target pixel. A kernel (11) may be any suitable size and/or shape. Typically, the kernel may be a square kernel (e.g. 3×3 or 5×5 pixels) centred on the target pixel (x). For denoising applications, a kernel of 9×9 pixels centred on the target pixel (x) may be considered to be suitable. In some examples, the kernel may be asymmetric. It is also possible that the kernel may not be centred on the target pixel.

The data model may be used to model the variation in one or more values associated with the pixels in a kernel. Each pixel value may comprise one or more characteristics of the respective pixel. For example, the characteristics indicated by the pixel values may include luma, luminance, chrominance, brightness, lightness, hue, saturation, chroma, colourfulness, or any colour component, such as Red, Green or Blue colour components. For example, the data model may model the variation in the luminance (Y) values associated with the pixels. In other examples, the data model may model the variation in chrominance (UV), or any one or more of red (R), green (G) or blue (B) components, luma, luminance, chrominance, brightness, lightness, hue, saturation, chroma, colourfulness, or any colour component. It may also be possible to model the variation in other pixel values, such as pixel values indicated in depth maps, normal maps or albedo maps (surface texture) associated with the image. In some examples, it may be possible to generate multiple models, each model modelling the variation in pixel values for a different characteristic.

The data model may be formed by selecting, in data model formation unit 102, a model representing a curve or a surface. The curve or surface may be of any arbitrary order. In a preferred example, the data model is a bilinear model. A bilinear model is a function of two variables that are independently linear in both those variables. A bilinear model can model the variation in pixel values in both the 'x' and 'y' directions. Thus, bilinear models are particularly suitable for use in the filtering of two-dimensional images. In one example, a bilinear model may be:

$$\beta(x_i-x)+\hat{I}$$

Where $\beta$ represents a 2D gradient and is represented as a vector, i.e. $\beta=[\beta_x, \beta_y]$, and $\hat{I}$ is an estimated value at the position of the target pixel value (x). In this example, the bilinear data model represents a plane, where points on the plane can be expressed as the sum of: (i) an estimated value at the target pixel position, x and (ii) the result of a vector multiplication (a dot product) of the 2D gradient $\beta$ with a difference in position $(x_i-x)$ between a neighbouring pixel to be weighted and the target pixel. In some examples, the target pixel may be defined to be at an origin of a coordinate system for the filter kernel (i.e. at x=[0,0]), such that the data model can be expressed more simply as $\beta x_i+\hat{I}$.

Data Term

The formed data model may be incorporated into a data term. The data term in accordance with the examples defined herein may be based on the data term as traditionally defined in the bilateral filter equation. As briefly described above, this modified data term and a geometric term may be used in fitting the data model to the pixels within the kernel. The data model may enable the data term to account for variation between neighbouring pixels that typically exists in real images.

In an example, the data term used in filtering a target pixel value in accordance with the examples given herein may be:

$$d(I(x_i)-\beta(x_i-x)-\hat{I})$$

where $I(x_i)$ is the neighbouring pixel value at position $x_i$, and $\hat{I}$ is a current or running estimate for the target pixel value.

In situations where the filter is only to be used in a non-iterative manner, or for a first iteration of the filter comprising an iterative loop 106, the current or running estimate for the target pixel value may be the value of the target pixel as input to the system, $I(x)$. For the second and subsequent iterations, the current or running estimate for the target pixel value may be the value for the target pixel value estimated in the previous iteration.

The data model may represent a predicted value for each pixel of the kernel of pixels of the image. That is, the value of the data model at a position, $x_i$, may represent a predicted value for a pixel at that position within a kernel.

Figure 2:
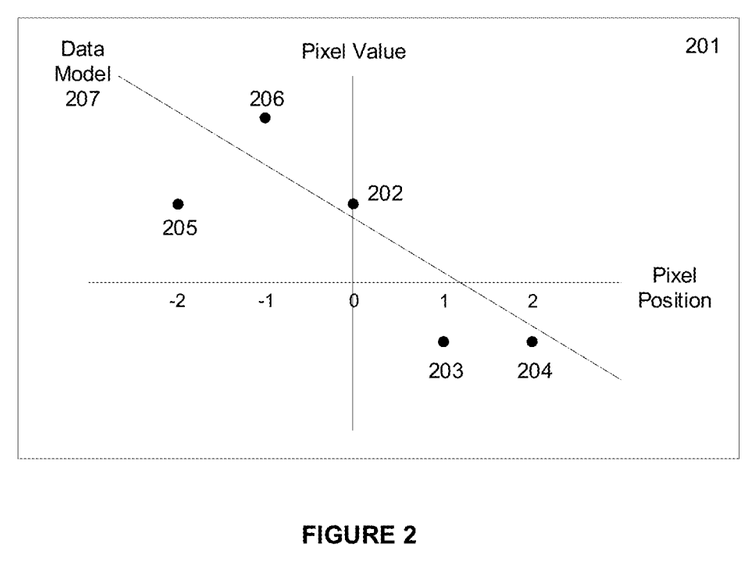
FIG. 2 schematically depicts a data model for a kernel of five pixels.

For example, FIG. 2 schematically depicts a data model 207 generated for a kernel of five pixels 202, 203, 204, 205 and 206. The kernel comprises two pixels positioned either side of the target pixel 202. The data model 207 may be a bilinear data model, where the variation in pixel values by position in only one dimension (e.g. x or y) is depicted in FIG. 2. The data model 207 models the variation in the pixel values of pixels 202, 203, 204, 205 and 206 within the kernel. Schematically, a predicted pixel value for each of the neighbouring pixel positions in the kernel could be read from the data model 207.

By incorporating a data model into the data term, the weight for each neighbouring pixel may be dependent on the difference between the actual value of each neighbouring pixel and the value predicted for that pixel according to the data model. In this way, the weight for each neighbouring pixel in the filtering process may be increased if that neighbouring pixel has a value which is closer to the value predicted by the model.

For example, referring back to FIG. 2, pixels 203 and 204 have the same pixel value. For the data term of a standard bilateral filter (without a data model) the value of the data term for each of these pixels 203, 204 would be the same. However, by incorporating a data model in the data term in accordance with present disclosure, the data term for pixel 204 would be greater than the data term for pixel 203. This is because the value of pixel 204 is closer than the value of pixel 203 to the value predicted by the data model 207. Considering now pixels 205 and 206, pixel 205 has the same value as the target pixel 202, whereas pixel 206 has a very different pixel value to the target pixel 202. Because of this, for the data term of a standard bilateral filter (without a data model) the data term for pixel 205 would be greater than the data term for pixel 206. However, according to the examples given herein, the data term for pixel 206 may be greater than the data term for pixel 205 because pixel 206 is closer than the value of pixel 205 to the value predicted by the data model 207.

Filtering

As described below, the current or running estimate for the target pixel value ($\hat{I}$) may be directly derivable from the data model. That is, it may not be necessary to perform a full weighted combination of pixel values as in a traditional bilateral filter.

In some examples, the parameters of the formed data model, e.g. $\beta$ and $\hat{I}$, may initially be set such that $\beta=[0,0]$ and $\hat{I}=I(x)$. In some examples, the coefficients of the data model may be estimated in dependence on prior knowledge of the input pixel values.

Prior to evaluating the formed data model, the data model may be updated by the data model updating unit 104. Updating the data model, i.e. updating the parameters $\beta_x$, $\beta_y$ and $\hat{I}$ may involve fitting the data model to the values of the pixels in the kernel. Fitting the model may involve minimising the error between the data model and the values of the pixels within the kernel, e.g. using an unweighted linear least squares technique, although in examples described in detail herein a weighted linear least squares technique is used. Fitting the model may result in the coefficients or parameters of the data model, e.g. $\beta_x$, $\beta_y$ and $\hat{I}$ being updated.

In some examples, in a first iteration, the data model may be fit to the pixel values of the kernel as input to the system. In other examples, prior to the first iteration, an initial standard filtering step is performed (e.g. in accordance with the standard bilateral filter equation).

The fitting of the data model may be performed by a weighted regression analysis technique. A weighted regression analysis technique may be any technique in the art that can be used to fit a model to a data set, in which the values of the data set are weighted. For example, the fitting of the data model may be performed using a weighted linear least squares method, a weighted local gradients measurement method, or any other suitable weighted regression analysis technique. Fitting a model using a weighted local gradient measurement method may involve measuring the pixel value gradients within a kernel by measuring the differences between pairs of pixel values, weighted according to data and geometric terms, as described below. Weighted local gradient measurements may therefore represent the variation in pixel values about a target pixel.

Thus, in order to update the data model, the weights for the weighted regression analysis must be calculated. This step may be performed by the weight calculating unit 103. The weight calculating unit 103 may calculate weights based on the weights traditionally used in a bilinear filter weighted combination. That is, the weight for a particular neighbouring pixel in the weighted regression analysis is based on both (i) a data term that, according to examples given herein, incorporates a data model, and (ii) a geometric term based on a difference in position between the neighbouring pixel and the target pixel. The weights used to update the data model may take the form:

$$W(x_i, x) = d(I(x_i) - \beta(x_i - x) - \hat{I}) g(x_i - x)$$

Where $d(\ )$ and $g(\ )$ are Gaussian functions as described above, the expanded expression for the weights becomes:

$$W(x_i, x) = e^{-\frac{\|I(x_i) - \beta(x_i - x) - \hat{I}\|^2}{2\sigma_d^2}} e^{-\frac{\|x_i - x\|^2}{2\sigma_g^2}}$$

where $\sigma_d$ and $\sigma_g$ are the smoothing parameters. The smoothing parameters may be based on an estimate of the level of noise in an image, with larger values typically being chosen to provide more smoothing in images or parts of images with higher levels of noise.

In this example the functions $d(\ )$ and $g(\ )$ are both Gaussian functions. The Gaussian has an appropriate peaked shape and is easily calculated, but alternative functions may also be used. For example, a triangular function, or a function defined by a spline, e.g. a cubic spline, may be used instead. The functions used for $d(\ )$ and $g(\ )$ do not need to be of the same type. For example, $d(\ )$ may use a Gaussian while $g(\ )$ uses a triangular function.

Thus, updating the data model may comprise minimising a weighted sum of the squared residual errors between the pixel values for the neighbouring pixels predicted by the data model and the corresponding actual neighbouring pixel values of the kernel. In other words, the data model may be updated by finding the values of $\beta_x$, $\beta_y$ and $\hat{I}$ according to:

$$\min_{\beta,\hat{I}} \sum_{i \in \Omega} W(x_i, x) \| I(x_i) - \beta(x_i - x) - \hat{I} \|^2$$

Once the data model has been updated, the value of the data model at the target pixel position, x (e.g. I(0) in the case where the target pixel is at the centre of the kernel) can be evaluated and thus the current or running estimate for the target pixel value, $\hat{I}$, can be updated.

The process of: (1) calculating weights in dependence on the data model parameters $\beta_x$, $\beta_y$ and $\hat{I}$; (2) updating the data model using a weighted linear regression technique such as a weighted linear least squares technique; and (3) evaluating the model so as to determine the updated data model parameters $\beta_x$, $\beta_y$ and $\hat{I}$: may be repeated iteratively.

That is, if a further iteration is to be performed the model parameters ($\beta_x$, $\beta_y$ and $\hat{I}$) are also evaluated by the data model evaluating unit 105 for feeding back into the weight calculating unit 103. The updated the model parameters ($\beta_x$, $\beta_y$ and $\hat{I}$) may be fed back into the weight calculating unit via iterative loop 106. The filter weights may therefore change between iterations because they depend on the model parameters ($\beta_x$, $\beta_y$ and $\hat{I}$) of the previous iteration.

Figure 3:
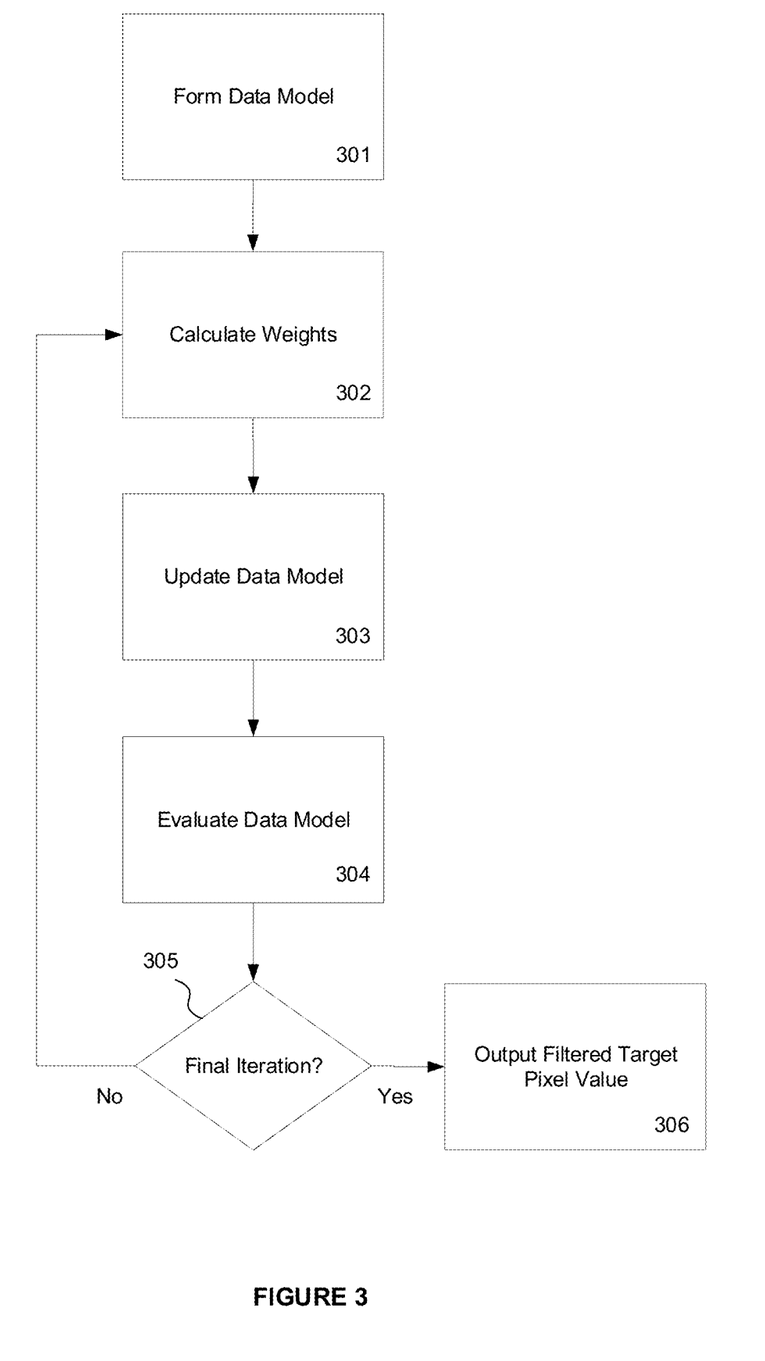
FIG. 3 is a flow diagram illustrating an exemplary iterative implementation of a system for filtering an image.

FIG. 3 is a flow diagram illustrating an exemplary iterative use of a system for filtering an image configured in accordance with the principles described herein.

In step 301, a data model for representing the variation in pixel values within the kernel is formed in accordance with the examples described above.

In step 302, a set of weights are calculated based on a geometric term and a data term which includes the data model as described in the examples given herein.

In step 303, the data model is updated using a weighted linear regression technique (e.g. a weighted linear least squares technique) in dependence on the calculated weights.

In step 304, the updated data model is evaluated so as to determine the updated data model parameters $\beta_x$, $\beta_y$ and $\hat{I}$.

If, at decision 305, no further iterations are to be performed, the current or running estimate for the target pixel value, $\hat{I}$, may be output 306 as the filtered target pixel value.

If, at decision 305, further iterations are to be performed, the updated data model parameters ($\beta_x$, $\beta_y$ and $\hat{I}$) are used to re-calculate the weights in step 302. The process of updating 303 and evaluating 304 the data model can be repeated. In this way, the current estimate of the target pixel value, $\hat{I}$ (as well as the other data model parameters ($\beta_x$ and $\beta_y$) can be iteratively refined.

The number of iterations to be performed may be dependent on the computational resources available. In other examples, the type of pixel value being filtered, or the order of the data model being used, may be a factor in deciding how many iterations are to be performed. The number of iterations to be performed may also be determined dynamically, e.g. in dependence on a weighted measure of error between the values predicted for the pixels within the kernel by the data model and the values of the pixels in the kernel. For example, the method could stop iterating when the weighted sum of squared errors ($\Sigma_{i \in \Omega} W(x_i, x) \| I(x_i) - \beta(x_i - x) - \hat{I} \|^2$) is below a threshold.

The filtering process may be repeated for each of the pixels in the input image, or for a subset of the pixels in the input image. For example, only a section of an image may be filtered. In other examples, every other pixel may be filtered. The filtering process minimises the noise in an image, because each of the output filtered target pixel values is dependent on a number of neighbouring pixel values. In that way, outlying pixel values may be removed.

Exemplary Filtering Algorithm

The iterative filtering of a target pixel value according to the present disclosure may be performed according to the following exemplary algorithm. In this example the data model is a bilinear model.

Inputs:

I(x), $x \in \Omega$—the current working kernel, with the target/output pixel at x=0.

g(x)—A geometric cost function.

d (I(x)—$\beta x$—$\hat{I}$)—A photometric cost function dependent on a data model, $\beta x$ and an estimate of the target pixel value, $\hat{I}$, where $\beta$ is a vector having components $\beta_x$ and $\beta_3$, (i.e. $\beta=[\beta_x, \beta_y]$) defining the gradient of the bilinear model in x and y directions.

$\sigma_g$—Geometric smoothing parameter.

$\sigma_d$—Data smoothing parameter.

$N_{iter}$—the number of fitting iterations to perform.

Output:

$\hat{I}$— a new estimate for the value at the target/output pixel location x=0.

Algorithm:
1. Initialise gradient parameters: $\beta \leftarrow [0\ 0]$.
2. Initialise target pixel estimate: $\hat{I} \leftarrow I(0)$.
3. For i=1 ... $N_{iter}$ (repeat $N_{iter}$ times)
   a. Compute weights: $W(x) \leftarrow g(x)d(I(x) - \beta x - \hat{I})$
   b. Estimate $\beta$, $\hat{I}$ using weighted linear least squares applied to the pixel values I(x) in the kernel $\Omega$, using the weights W(x).

where the parameters, $\beta$ and $\hat{I}$, of the bilinear data model may be found using weighted linear least squares as follows:

The coordinates of all the pixels in the kernel may be arranged in an M×3 matrix, $$X = \begin{bmatrix} x_1 & \cdots & x_M \\ 1 & \cdots & 1 \end{bmatrix}^T,$$

where M is the number of pixels in the kernel $\Omega$. The pixel values may be arranged in a column vector, $$i = [I(x_1) \ldots I(x_M)]^T.$$

The data model may be expressed as, $$i = X[\beta_x \beta_y \hat{I}]^T.$$

The standard weighted linear least squares solution to this equation is, $$[\beta_x \beta_y \hat{I}]^T = (X^T W X)^{-1} X^T W i$$

Here W is a diagonal matrix containing the weights computed in accordance with the present disclosure, $$W_{j,j} = W(x_j) = g(x)d(I(x) - \beta x - \hat{I})$$

Alternative Non-Iterative Method

In the examples given above, an iterative method solves simultaneously for the weights and the data model, including the filtered pixel value $\hat{I}$, where the weights and data model depend on each other.

In an alternative example, a data model may be determined first, using any appropriate fitting method. The filter may then be applied to the kernel using a weighted combination, with weights determined with respect to the data model.

For example, a data model may be found using a method such as one based on local gradient measurement. Such a method may determine average gradients ($\beta$) in both x and y directions, from a summation of multiple pixel value differences determined from pairs of pixels located within the kernel. Weighting may be applied to the pixel value differences, for example based on a photometric cost function, but without the use of a data model.

Similarly, a value for $\hat{I}$ may be found, which may be a weighted or unweighted average of the pixel values within the kernel, and which may also be based on the determined average gradients. For example, each pixel value at position $x_i$ within the kernel may be used to provide an estimate for $\hat{I}$ at the target pixel position x based on the determined gradients and the difference in position between the target pixel position x and the position $x_i$. For example, an estimate for $\hat{I}$ using the pixel value at position $x_i$ may be given by $I(x_i)-\beta(x_1-x)$. The estimates for $\hat{I}$ from the different pixel values within the kernel can then be summed and normalised, e.g. using a weighted sum, to determine a model pixel value $\hat{I}$ at the target pixel position. The weights of the weighted sum may be determined as described above, e.g. based on a photometric cost function.

Finally, an output pixel value may be determined by computing weights, according to the determined data model, and applying those weights in a weighted sum:

$$W(x) \leftarrow g(x) d(I(x) - \beta x - \hat{I})$$
$$I_{filtered} = \frac{1}{K} \sum_{x \in \Omega} I(x) W(x)$$

where K is the normalisation term:

$$K = \sum_{x \in \Omega} W(x)$$

Alternative Data Models

In the examples described above, the data model is a bilinear model. However, various data models may be incorporated into the data term of a bilateral filter. For example, the models may be linear, bilinear, biquadratic, parametric, polynomial models of any arbitrary order, or any other suitable model.

In an example, a simple linear model may be appropriate. For example, a simple linear model may take the form, $\alpha(x_i-x)$, where $\alpha=[\alpha_x]$). Images may be filtered using linear kernels, i.e. 1D kernels. For example, an image may be filtered by filtering each of the rows or columns of pixels using one or more linear kernels. Alternatively, the rows of pixels in an image may first be filtered using linear kernels, followed by the filtering of the columns of pixels using linear kernels, or vice versa.

In another example, a biquadratic model may be incorporated into the data term. For example, the data term may take the form:

$$d(I(x_i)-(x_i-x)^T A(x_i-x)-\beta(x_i-x)-\hat{I})$$

In this example, A is a 2×2 second order gradient coefficient matrix.

It can be advantageous to use higher order models (i.e. higher order than linear/bilinear models) which can provide more accurate models of image values within kernels of pixels within the image. For example, where the kernel is relatively large, it may become apparent that the curvature of the data is not approximated sufficiently well by the linear/bilinear model over the width of the kernel. That is, conceptually, if you were to look at a section of data representing a curve through a small enough kernel, each small section of that curve may appear as a straight line. In this case, using a bilinear model may be suitable for modelling each small section of the curve. However, if you were to look at the same data through a larger kernel it may become clear that a curve is present. In this case, a higher order model may be desirable to accurately account for the curvature. However, typically higher order models have a greater computational cost, and there can be difficulties due to degenerate cases (e.g. cases where there is not enough data to uniquely and stably determine the model). In addition, poor higher order models can result in over-fitting which may enhance noise features instead of removing them.

In some examples, the data model may not be of the same order in both 'x' and 'y' directions. For example, the model could be linear in the 'x' direction and quadratic in the 'y' direction. With reference to the biquadratic data model described above, this could be achieved by setting one or more of the coefficients in A, a 2×2 second order gradient matrix, to zero. For example, video sequences comprising a sequence of 2D image frames have two spatial dimensions and one temporal dimension. Data in the temporal dimension may be filtered using a different model to data in the spatial dimensions.

The type or order of the model chosen may be dependent on the type of pixel values being modelled (e.g. luminance, chrominance etc.). For example, if the filter were to be used to filter luminance (Y) values, a higher order model, e.g. a first-order (i.e. bilinear) model may be suitable. When filtering chrominance values, a lower order model, e.g. a zeroth-order (i.e. constant) model may be more suitable. This choice may be made in dependence on prior knowledge of the resilience of a type of pixel value to over-fitting. In other cases, this choice may be made based on trial and error.

Cross Filters

Where pixel values have multiple channels (e.g. RGB channels or YUV channels), the filter may be implemented as a cross filter (or "joint filter"). In a cross filter example, the data term may be dependent on differences in more than one channel.

For example, in YUV images, the luminance (Y) channel tends to have more resolution and detail than the chrominance (U and V) channels. A data term based on the content of the Y channel may therefore be used when filtering the chrominance channels to identify image features (e.g. edges) that are not apparent in the chrominance data alone. In other cases, the chrominance channels may have features that are not apparent in the luminance channel. The data term used in calculating weights may be a function of data terms from some or all of the channels, e.g. a maximum or average value of data terms.

In other examples, non-image data may be available. For example, an image may be taken by a camera that incorporates a depth sensor, such that a depth value is available for each image pixel, indicating the distance from the camera of the object visible at that pixel. Changes in depth value may indicate image features, e.g. edges that are not apparent from the image data alone, and may therefore provide useful information that can be incorporated into a data term. Depth data produced by a camera is often noisy and may require pre-processing before being used in this way. In some examples, image data may be used in a cross filter to condition depth data, and depth data may be used in a cross filter to condition image data.

Another application of a cross filter configured in accordance with the principles herein may be in denoising ray-traced images, where additional information can be produced by the renderer, e.g. depth maps, normal maps, albedo maps (surface texture), etc. In this example the additional maps are of high quality and can support higher order models without experiencing problems with over-fitting to noise.

Asymmetric Kernels

According to the examples described herein, the filter may use asymmetric kernels (kernels with fewer pixels on one side of the centre pixel than on the other, or greater weight assigned on one side of the centre pixel) without introducing asymmetric artefacts into the filtered output.

When using an asymmetric kernel, the classic bilateral filter produces a result that is effectively translated/shifted towards the centre of the kernel.

When a linear or higher order data model is introduced into the data term in accordance with the present disclosure, this problem does not occur to the same extent. The data models described herein are fitted/updated so as to represent the variation in pixel values across a kernel. The embodiments of the invention described herein work to produce a filtered value by evaluating a data model. The data model is fitted to the data in the entire kernel according to the data and geometry terms defined herein. Therefore a filtered output value may be produced at any position within the kernel by evaluating the model at that position. Although the result will still reflect the weightings of the bilateral filter so that pixels with higher weights have a greater influence on the filtered pixel value, the gradient terms add an extrapolation effect so that the output estimate remains at the intended coordinates.

Example Implementations

In the following we present exemplary implementations of the system and method for filtering of a target pixel in an image as disclosed herein. These exemplary implementations may be performed using a system for filtering an image as described herein, in accordance with FIG. 1.

Example 2

Figure 4:
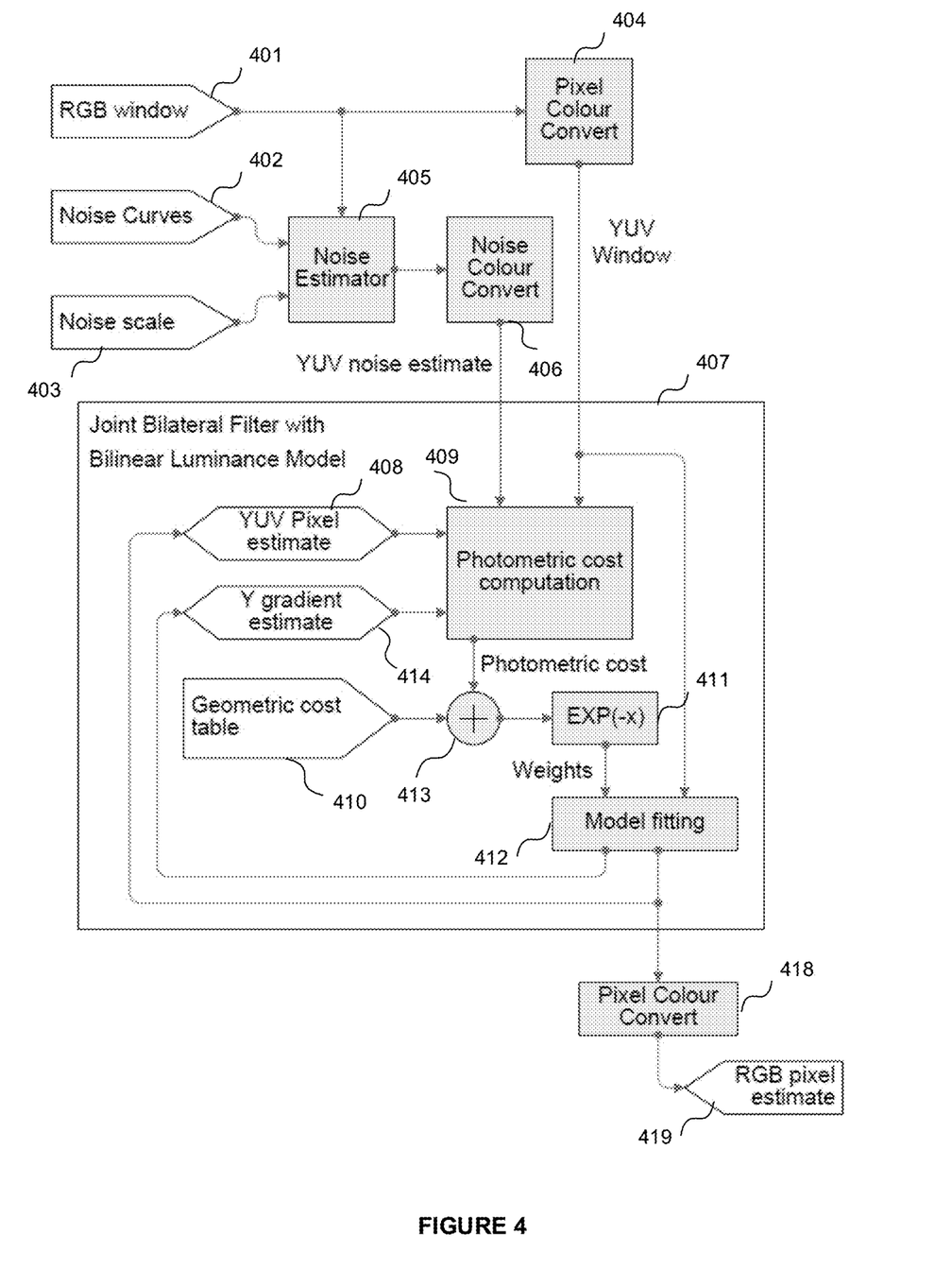
FIG. 4 depicts an exemplary image filtering system.

FIG. 4 depicts an exemplary image filtering system. The image filtering system of FIG. 4 may comprise a cross or joint bilateral filter (407). The data model may be a bilinear model with respect to luminance. The image filtering system of FIG. 4 may be particularly applicable as a denoising filter.

In Example 2, an image may be input from RGB window (401) in RGB colour space. Noise estimator (405) may use the target pixel to estimate the local noise variance. The noise estimate may be converted to chrominance colour space by noise colour converter (406). The target pixel value may by filtered by the joint bilateral filter with bilinear luminance model (407). The target pixel estimate may be initialised with the input target pixel value and the luminance gradients may initially be set to 0. At each iteration, the error between the estimate and the input window may be measured and used to calculate data weights. A new model estimate may be computed using the input window and weights. The final pixel estimate may be converted back to RGB space by pixel colour convert (418). Example 2 may be performed according to the following algorithms for (a) a denoising filter, (b) a photometric cost computation, and (c) model fitting:

(a) Denoising Filter

Input:

$I_{RGB}$ The RGB image.

$\sigma_{LUT}$—Noise curve look-up tables.

$k_\sigma$—Noise variance scale factor.

(w, h)—The kernel/window size.

$N_{JBL}$ The number of iterations of the joint bilateral filter process.

Output:

$\hat{I}_{RGB}$ A new estimate of the RGB image.

Algorithm:

1. At each target pixel, $p_{RGB}$, the RGB noise estimates, $\{\sigma_R^2, \sigma_G^2, \sigma_B^2\}$, may be obtained from the noise curve look-up tables and scaled by $k_\sigma$.
2. The RGB noise estimates may be converted to YUV space noise estimates to give $\sigma_n^2 = \{\sigma_Y^2, \sigma_U^2, \sigma_V^2\}$.
3. A local RGB window may be converted to YUV, to produce a w×h window of pixels, $\Omega(x, y)$, with the target pixel aligned with $\Omega(0,0)$.
4. The target pixel estimate, $\hat{p}_{YUV}$, may be initialised as the target pixel in the input local YUV window, $\hat{p}_{YUV} \leftarrow \Omega(0,0)$.
5. The bilinear luminance gradient parameters may be initialised to zero, $g_x \leftarrow 0$, $g_y \leftarrow 0$.
6. The following may be repeated $N_{JBL}$ times to improve the YUV pixel estimate:
   a) Compute photometric costs $C_p$ and geometric costs $C_G$.
   Where $C_p$ is calculated as below, and $C_G = g(x)$
   b) Generate weights using photometric and geometric costs: $W = C_p \cdot C_G$.
   c) Update pixel and gradient estimates using model fitting.
7. The final target pixel estimate may be converted back to RGB space to yield $\hat{p}_{RGB}$.

(b) Photometric Cost Computation

Photometric cost computation may be performed by photometric cost computation unit (409).

Input:

$\hat{p}_{YUV} = \{\hat{p}_Y, \hat{p}_U, \hat{p}_V\}$—The current target pixel estimate in YUV space.

$\{g_x, g_y\}$—The current bilinear luminance gradient parameters.

$\sigma_n^2 = \{\sigma_Y^2, \sigma_U^2, \sigma_V^2\}$—The pixel noise estimate in YUV space.

$\Omega(x, y) = \{Y(x, y), U(x, y), V(x, y)\}$—The local window of YUV space pixels, where coordinates (0,0) are aligned with the target pixel.

Output:

$C_p(x, y)$—The photometric costs window corresponding to $\Omega(x, y)$.

Algorithm:

The pixel error for each pixel in the window may be computed as, $$e(x, y) = \begin{bmatrix} Y(x, y) \\ U(x, y) \\ V(x, y) \end{bmatrix} - \begin{bmatrix} \hat{p}_Y + xg_x + yg_y \\ \hat{p}_U \\ \hat{p}_V \end{bmatrix},$$

$$= [e_Y(x, y) \; e_U(x, y) \; e_V(x, y)]^\wedge T.$$

The photometric cost may be calculated from the joint, noise variance-normalised error, $$C_p(x,y)=d(e_Y(x,y),\sigma_Y)\cdot d(w_c e_U(x,y),\sigma_U)\cdot d(w_c e_V(x,y),\sigma_V)$$

where the function for the data term d( ) is modified to take an additional argument for the smoothing parameter σ:

$$d(q, \sigma) = e^{-\frac{\|q\|^2}{2\sigma^2}}$$

and tuneable parameter, $w_c$, is a weight that may be applied to the chrominance components to control their relative importance compared to the luminance component.

(c) Model Fitting

Model fitting may be performed by model fitting unit (412).

The model fitting process may estimate new pixel value and luminance gradient values from the kernel window and weights.

Inputs:

Ω(x, y)={Y(x, y), U(x, y), V(x, y)—The local window of YUV space pixels, where coordinates (0,0) are aligned with the target pixel.

W (x, y)—The kernel weights corresponding to Ω(x, y).

Output:

$\hat{p}_{YUV}=\{\hat{p}_Y, \hat{p}_U, \hat{p}_V\}$—A new target pixel estimate in YUV space.

$\{g_x, g_y\}$—A new set of bilinear luminance gradient parameters.

Algorithm:

The following moments of the weights may be used in computations below:

$$\mu_0 = \mu_0(W) = \sum_{\forall (x,y)\in\Omega} W(x, y),$$

$$\mu_x = \mu_x(W) = \sum_{\forall (x,y)\in\Omega} xW(x, y),$$

$$\mu_y = \mu_y(W) = \sum_{\forall (x,y)\in\Omega} yW(x, y),$$

$$\mu_{xx} = \mu_{xx}(W) = \sum_{\forall (x,y)\in\Omega} x^2 W(x, y),$$

$$\mu_{xy} = \mu_{xy}(W) = \sum_{\forall (x,y)\in\Omega} xy W(x, y),$$

$$\mu_{yy} = \mu_{yy}(W) = \sum_{\forall (x,y)\in\Omega} y^2 W(x, y).$$

The chrominance channels may be modelled using a zero order model, which is fitted using simple weighted averaging:

$$\hat{p}_U = \mu_0^{-1}\sum_{\forall (x,y)\in\Omega} W(x, y)U(x, y),$$

$$\hat{p}_V = \mu_0^{-1}\sum_{\forall (x,y)\in\Omega} W(x, y)V(x, y).$$

The luminance channel may be modelled using a bilinear model, defined as:

$$\hat{Y}(x,y)=\hat{p}_Y+xg_x+yg_y$$

The bilinear model may be fitted to the data using the method of Weighted Linear Least Squares (WLLS). The WLLS algorithm has been reformulated as a set of weighted sums, to avoid matrix inversions. It may be possible for the data to be in a degenerate configuration, so that it is not possible to resolve all three parameters of the model uniquely. There may be two degenerate configurations:

1. Only one pixel has non-zero weight. In this case $\hat{p}_Y$ may be equal to the pixel with non-zero weight (usually the target pixel, so that $\hat{p}_Y$ is unchanged), and $g_x=g_y=0$. This case may be detected by checking for $\mu_{xx}=\mu_{yy}=0$.
2. Pixels with non-zero weight may be arranged in a straight line, so that only one gradient is defined. This 1D degeneracy may be detected by checking if the second order moments form a singular matrix.

There may therefore be three cases that each require a solution, as listed below.

Non-Degenerate Case:

$$d = \mu_{xx}(\mu_{yy}\mu_0 - \mu_y^2) + \mu_{xy}(\mu_x\mu_y - \mu_{xy}\mu_0) + \mu_x(\mu_{xy}\mu_y - \mu_x\mu_{yy}),$$

$$g_x = d^{-1}\sum_{\forall (x,y)\in\Omega} ((\mu_{yy}\mu_0 - \mu_y^2)x + (\mu_x\mu_y - \mu_{xy}\mu_0)y + (\mu_{xy}\mu_y - \mu_x\mu_{yy}))$$
$$W(x, y)Y(x, y),$$

$$g_y = d^{-1}\sum_{\forall (x,y)\in\Omega} ((\mu_x\mu_y - \mu_{xy}\mu_0)x + (\mu_{xx}\mu_0 - \mu_x^2)y + (\mu_{xy}\mu_x - \mu_{xx}\mu_y))$$
$$W(x, y)Y(x, y),$$

$$\hat{p}_Y = d^{-1}\sum_{\forall (x,y)\in\Omega} ((\mu_{xy}\mu_y - \mu_x\mu_{yy})x + (\mu_{xy}\mu_x - \mu_{xx}\mu_y)y + \mu_{xx}\mu_{yy} - \mu_{xy}^2)$$
$$W(x, y)Y(x, y).$$

In the 1D degenerate case, only one gradient may be defined. Instead of defining a new 1D coordinate system, it may be desirable to use the existing coordinate system. The non-zero pixels may be aligned with either x- or y-axis, or may be at some other angle. The solution is as follows:

$$d_x = \mu_{xx}\mu_0 - \mu_x^2,$$

$$d_y = \mu_{yy}\mu_0 - \mu_y^2,$$

$$g_x' = \sum_{\forall (x,y)\in\Omega} (\mu_0 x - \mu_x)W(x, y)Y(x, y),$$

$$g_y' = \sum_{\forall (x,y)\in\Omega} (\mu_0 y - \mu_y)W(x, y)Y(x, y),$$

$$\hat{Y}_x = \sum_{\forall (x,y)\in\Omega} (\mu_{xx} - \mu_x x)W(x, y)Y(x, y),$$

$$\hat{Y}_y = \sum_{\forall (x,y)\in\Omega} (\mu_{yy} - \mu_y y)W(x, y)Y(x, y).$$

If $\mu_{xx}\geq\mu_{yy}$,
d=$d_x$,
$g_x$=$d^{-1}g_x'$,
$g_y$=0
$\hat{p}_Y$=$d^{-1}\hat{Y}_x$,
else
d=$d_y$,
$g_x$=0
$g_y$=$d^{-1}g_y'$,
$\hat{p}_Y$=$d^{-1}\hat{Y}_y$.

In the point degenerate case: $\hat{p}_Y$ is unchanged.

The data processing system of FIGS. 1 and 4 are shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing systems described herein may be embodied in hardware on an integrated circuit. The data processing system s described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a data processing system configured to perform any of the methods described herein, or to manufacture a data processing system comprising any apparatus described herein. An integrated circuit definition dataset may be, for example, an integrated circuit description.

There may be provided a method of manufacturing, at an integrated circuit manufacturing system, a data processing system as described herein. There may be provided an integrated circuit definition dataset that, when processed in an integrated circuit manufacturing system, causes the method of manufacturing a data processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system will now be described with respect to FIG. 6.

Figure 6:
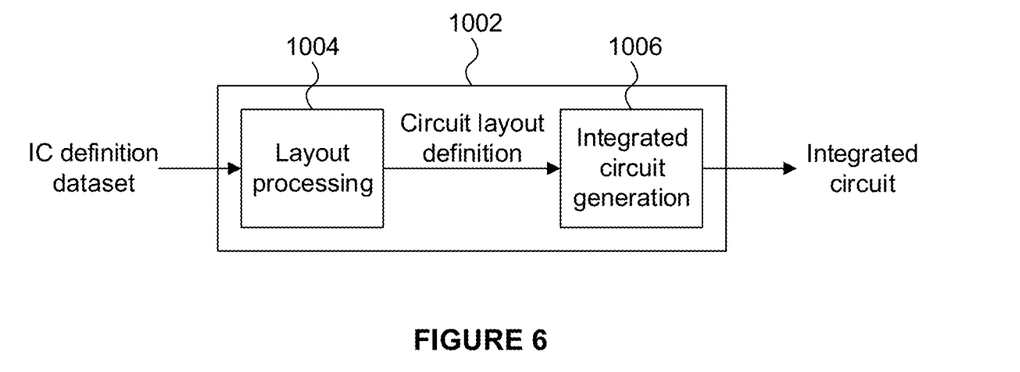
FIG. 6 is a schematic diagram of an integrated circuit manufacturing system.

FIG. 6 shows an example of an integrated circuit (IC) manufacturing system 1002 which is configured to manufacture a data processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 1002 to manufacture an integrated circuit embodying a data processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a data processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of filtering a target pixel in an image, comprising:
   forming, for a kernel of pixels comprising the target pixel and its neighbouring pixels, a data model to model pixel values within the kernel;
   calculating a weight for each pixel of the kernel comprising: (i) a geometric term dependent on a difference in position between that pixel and the target pixel; and (ii) a data term dependent on a difference between a pixel value of that pixel and its predicted pixel value according to the data model; and using the calculated weights for the pixels in the kernel to form a filtered pixel value for the target pixel.

2. The method of claim 1, wherein said using the calculated weights comprises:
updating the data model with a weighted regression analysis technique using the calculated weights for the pixels of the kernel; and
evaluating the updated data model at the target pixel position so as to form the filtered pixel value for the target pixel.

3. The method of claim 2, the method further comprising performing one or more iterations of the calculating and updating steps, wherein updated weights are calculated using the updated data model of the preceding iteration.

4. The method of claim 2, wherein updating the data model comprises minimising a weighted sum of the squared residual errors between the pixel values of the kernel predicted by the data model and the corresponding actual pixel values of the kernel.

5. The method of claim 2, wherein the weighted regression analysis technique comprises performing a weighted least squares method.

6. The method of claim 2, wherein the weighted regression analysis technique comprises performing a weighted local gradient measurements method.

7. The method of claim 1, wherein said forming a data model comprises applying a first filter to the kernel so as to form a target pixel value for use in calculating the weights.

8. The method of claim 7, wherein the first filter is a bilateral filter.

9. The method of claim 1, wherein the data model is defined by one or more parameters including one or more gradient parameters, $\beta$, and an estimated value, $\hat{I}$, at the position of the target pixel, and wherein forming the data model comprises selecting a data model defining a curve or surface suitable for modelling the pixel values within the kernel, and setting the one or more gradient parameters of the data model to zero.

10. The method of claim 1, wherein the data model is a bilinear data model, a linear data model, a biquadratic data model, a quadratic data model, a parametric data model or a polynomial data model.

11. The method of claim 1, wherein each pixel value comprises one or more characteristics of the respective pixel.

12. The method of claim 11, wherein each characteristic is one or more of depth information, information describing normal vectors for surfaces identified in the image, texture information, luma, luminance, chrominance, brightness, lightness, hue, saturation, chroma, colourfulness, or any colour component.

13. The method of claim 1, wherein the filtered pixel value for the target pixel is formed for a first channel, the method further comprising:
forming a second filtered pixel value for the target pixel for a second channel in dependence on a second data model, by
forming, for the kernel of pixels comprising the target pixel and its neighbouring pixels, a second data model to model a second characteristic represented by pixel values within the kernel;
calculating a weight for each pixel of the kernel comprising: (i) a geometric term dependent on a difference in position between that pixel and the target pixel;
and (ii) a data term dependent on a difference between a pixel value of that pixel and its predicted pixel value according to the second data model; and
using the calculated weights for the pixels in the kernel so as to form a second filtered pixel value for the target pixel.

14. The method of claim 1, wherein the kernel is symmetric about the target pixel.

15. The method of claim 1, wherein the kernel is asymmetric about the target pixel.

16. The method of claim 1, wherein the filtering is cross filtering, such that the filtered pixel value is in a first channel, and the data term is dependent on pixel value differences in a second channel.

17. The method of claim 16, wherein the data term is dependent on pixel value differences in more than one channel.

18. The method of claim 1, wherein said forming a data model comprises:
determining average gradients ($\beta$) in both x and y directions, from a summation of multiple pixel value differences determined from pairs of pixels located within the kernel;
determining, from each pixel in the kernel, an estimated pixel value $\hat{I}$ at the target pixel position based on the determined average gradients; and
determining a model pixel value $\hat{I}$ at the target pixel position by performing a weighted sum of the estimated pixel values $\hat{I}$ determined from each of the pixels in the kernel.

19. A data processing system for filtering a target pixel in an image, the data processing system comprising:
data model formation logic configured to form, for a kernel of pixels comprising the target pixel and its neighbouring pixels, a data model to model pixel values within the kernel;
weight calculating logic configured to calculate a weight for each pixel of the kernel comprising: (i) a geometric term dependent on a difference in position between that pixel and the target pixel; and (ii) a data term dependent on a difference between a pixel value of that pixel and its predicted pixel value according to the data model; and
data modelling logic configured to use the calculated weights for the pixels in the kernel so as to form a filtered pixel value for the target pixel.

20. A non-transitory computer readable storage medium having stored thereon computer readable instructions that, when executed at a computer system, cause the computer system to:
form, for a kernel of pixels comprising a target pixel in an image and its neighbouring pixels, a data model to model pixel values within the kernel;
calculate a weight for each pixel of the kernel comprising: (i) a geometric term dependent on a difference in position between that pixel and the target pixel; and (ii) a data term dependent on a difference between a pixel value of that pixel and its predicted pixel value according to the data model; and
use the calculated weights for the pixels in the kernel to form a filtered pixel value for the target pixel.

* * * * *